United States Patent [19]
Shih

[11] Patent Number: 5,904,907
[45] Date of Patent: May 18, 1999

[54] MIXING SYSTEM FOR MIXING AND DISTRIBUTING FLUIDS IN A REACTOR

[75] Inventor: John Shih, Oakland, Calif.

[73] Assignee: Chevron U.S.A., Inc., Pa.

[21] Appl. No.: 08/963,264

[22] Filed: Nov. 3, 1997

[51] Int. Cl.$^6$ ...................................................... B01J 8/04
[52] U.S. Cl. ........................ 422/211; 369/304; 369/337; 369/341
[58] Field of Search ............................ 422/211; 369/337, 369/304, 341

[56] References Cited

U.S. PATENT DOCUMENTS

| | | |
|---|---|---|
| 3,502,445 | 3/1970 | Ballard et al. . |
| 3,541,000 | 11/1970 | Hanson et al. . |
| 3,705,016 | 12/1972 | Ludwigsen et al. . |
| 3,977,834 | 8/1976 | Alcock et al. . |
| 4,182,741 | 1/1980 | Carson et al. . |
| 4,836,989 | 6/1989 | Aly et al. . |
| 4,960,571 | 10/1990 | Bhagat et al. . |
| 5,076,908 | 12/1991 | Stangeland et al. . |
| 5,302,357 | 4/1994 | Kramer et al. . |
| 5,462,719 | 10/1995 | Pedersen et al. . |

Primary Examiner—Timothy McMahon
Attorney, Agent, or Firm—Burns, Doane, Swecker & Mathis, L.L.P.

[57] ABSTRACT

A mixing chamber for a multi-bed, down-flow catalytic reactor includes two top openings through which liquid and/or gaseous reactant streams pass into the mixing chamber. Inside the mixing chamber, the two reactant streams collide with each other to achieve mixing. The mixing is particularly enhanced by chevron flow dividers positioned in two rows in a staggered arrangement and located in a central mixing zone. The chevrons improve mixing by increasing turbulence in the colliding reactant streams. The fully mixed reactant streams exit the mixing chamber through side openings to a distributor plate which distributes the reactant stream across the catalyst.

22 Claims, 2 Drawing Sheets

5,904,907

MIXING SYSTEM FOR MIXING AND DISTRIBUTING FLUIDS IN A REACTOR

FIELD OF THE INVENTION

The invention relates to a distribution and mixing system for mixing a reactant stream in a reactor. More particularly, the invention relates to a mixing chamber for mixing liquid and vapor components of a reactant stream in a multi-bed, down-flow catalytic reactor for use in the chemical processing and petroleum refining industries.

BACKGROUND OF THE INVENTION

The chemical treatment of hydrocarbons and other compounds in the petroleum refining industry involves passing a fluid including both vapor phase and liquid phase components through a catalytic agent in a reactor to remove contaminants such as iron, other metals, nitrogen, sulfur, and calcium from the fluid. Examples of such processes in the petroleum refining industry include, for example, catalytic dewaxing, hydrotreating, hydrodesulfurization, hydrofinishing, hydrocracking, denitrogenation, hydrodenitrogenation combinations thereof, and others. These reactions are carried out by contact of a hydrogen-containing gas with a hydrocarbon feed stream at elevated temperatures and pressures in a hydroprocessing catalyst of a reactor.

One type of catalytic reactor system called a down-flow reactor includes one or more stationary catalyst bed through which a reactant stream of liquid hydrocarbon and hydrogen flows in a downward direction. As the reactant stream flows through the catalyst bed the liquid and vapor phases of the stream have a natural tendency to segregate and find separate paths through the catalyst. This tendency for the hydrogen and the hydrocarbon to find separate paths is commonly known as "channeling" and is highly detrimental to the overall efficiency of the reactor. The channeling causes formation of localized hot spots in the catalyst bed, reducing catalyst efficiency and requiring the catalyst to be replaced more often. The down time required for replacement of catalyst reduces the throughput of the reactor.

The channeling effect is increased by some of the chemical reactions which take place in these processes which may produce additional components in the vapor phase. In addition, because these reactions may also consume some of the hydrogen, it is frequently necessary to add additional hydrogen at various points within the reactor. When these vapor phase components separate from the reactant stream, are produced, or are added to the reactor, it is important that they be mixed with the liquid phase hydrocarbon components passing through the catalyst. To achieve the desired mixing of liquid and vapor phase components, mixing chambers or mixing boxes are positioned within the reactor at locations between successive catalyst beds.

The mixing chambers are used to uniformly redistribute the liquid and vapor phases at one or more locations within the reactor. This mixing counteracts the natural tendency for the liquid and vapor phases of the feed stream to segregate as the stream passes through the catalyst and seek separate paths through the catalyst. By providing a uniform distribution of liquid and gas, the catalyst will be efficiently utilized and the desired catalytic reactions will take place in a more predictable manner.

Further, radial thermal gradients, or hot spots, often occur in the catalyst beds of a reactor when the temperature of the fluid entering the catalyst bed is non-uniform. For example, quench gases may be added at one or more location when necessary to cool the reactor. Failure to fully mix the quench gases with the reactant stream, may create a temperature gradient across the reactor. The existence of hot spots within the catalyst bed leads to indiscriminate or non-selective hydrocracking of the hydrocarbons. For this additional reason, it is important to have mixing chambers within the reactor which provide a consistent fluid temperature distribution across the reactor. The better the mixing provided by the mixing chambers, the better the temperature and reaction control and the overall reactor performance.

Various systems have been proposed for achieving mixing in down-flow, catalytic reactors, for example, U.S. Pat. No. 3,541,000 includes a distributor employing liquid downcomers which allow the reactant stream collected on a collection plate to overflow into the downcomers. Angled chutes at the bottom of each of the downcomers cause the fluid to rotate within a mixing chamber beneath the collection plate. The rotation of the fluid promotes mixing of liquids and vapors.

Other distributor chambers for multi-bed, down-flow reactors are described in U.S. Pat. Nos. 5,462,719; 4,836,989; 4,182,741; and 3,977,834. However, many of the distributor chambers currently in use create an undesirably large pressure drop and/or provide incomplete mixing of components.

SUMMARY OF THE INVENTION

According to one aspect of the present invention, a mixing chamber for mixing liquid and vapor components of a reactant stream in a down-flow reactor includes inlets directing colliding reactant streams toward each other and turbulence creating elements for improving mixing of the reactant streams.

The mixing chamber achieves uniformity of hydrocarbon and hydrogen concentrations and temperature uniformity without a significant pressure drop as the fluid passes through the mixing chamber.

According to one aspect of the present invention, a mixing chamber for a catalytic reactor includes a first inlet directing a first stream of inlet fluid in a first direction, a second inlet directing a second stream of inlet fluid in a second direction which is generally opposite to the first direction, a first plurality of chevrons arranged along a first line, a second plurality of chevrons arranged along a second line, and first and second outlets. Preferably, the mixing chamber is a mixing box and the first and second inlets include circular entrance openings and channels directing fluid from the circular openings toward the chevrons. The second row of chevrons are arranged in a line which is substantially parallel to the first row of chevrons. The first outlet directs a first outlet stream in a direction substantially perpendicular to the first and second directions and the second outlet directs a second outlet stream in a direction substantially opposite to the direction of the first outlet stream.

In accordance with another aspect of the invention, a hydroprocessing reactor includes a collection tray, a mixing chamber receiving fluid from the collection tray, a distributor tray receiving fluid which has been mixed by the mixing chamber, and a catalyst bed receiving fluid from the distributor tray. The mixing chamber includes two opposed inlets directing streams of fluid to a mixing zone. The mixing zone includes two rows of spaced chevrons and a collision zone between the rows of spaced chevrons. The chevrons are arranged to improve the mixing within the collision zone where the two inlet streams collide.

According to an additional aspect of the present invention, a method of mixing liquid and vapor phases of a fluid in a hydroprocessing reactor includes a first step of directing a fluid containing both liquid and vapor phases in two oppositely directed streams towards a mixing zone. Turbulence is created in the fluid within the mixing zone by passing the oppositely directed fluid streams around two rows of spaced apart flow dividers. Preferably, the flow dividers in a first of the two rows are staggered with respect to the flow dividers in a second of the two rows. The two oppositely directed streams which have passed around the flow dividers collide in a collision zone and a mixed fluid having liquid and vapor phases evenly interspersed exits the collision zone from the sides of the mixing chamber.

BRIEF DESCRIPTION OF THE DRAWINGS

The structure and operation of the present invention will be better understood by reference to the following drawings in which like reference numerals identify like parts and wherein.

DETAILED DESCRIPTION OF THE PREFERRED EMBODIMENTS

Figure 1:
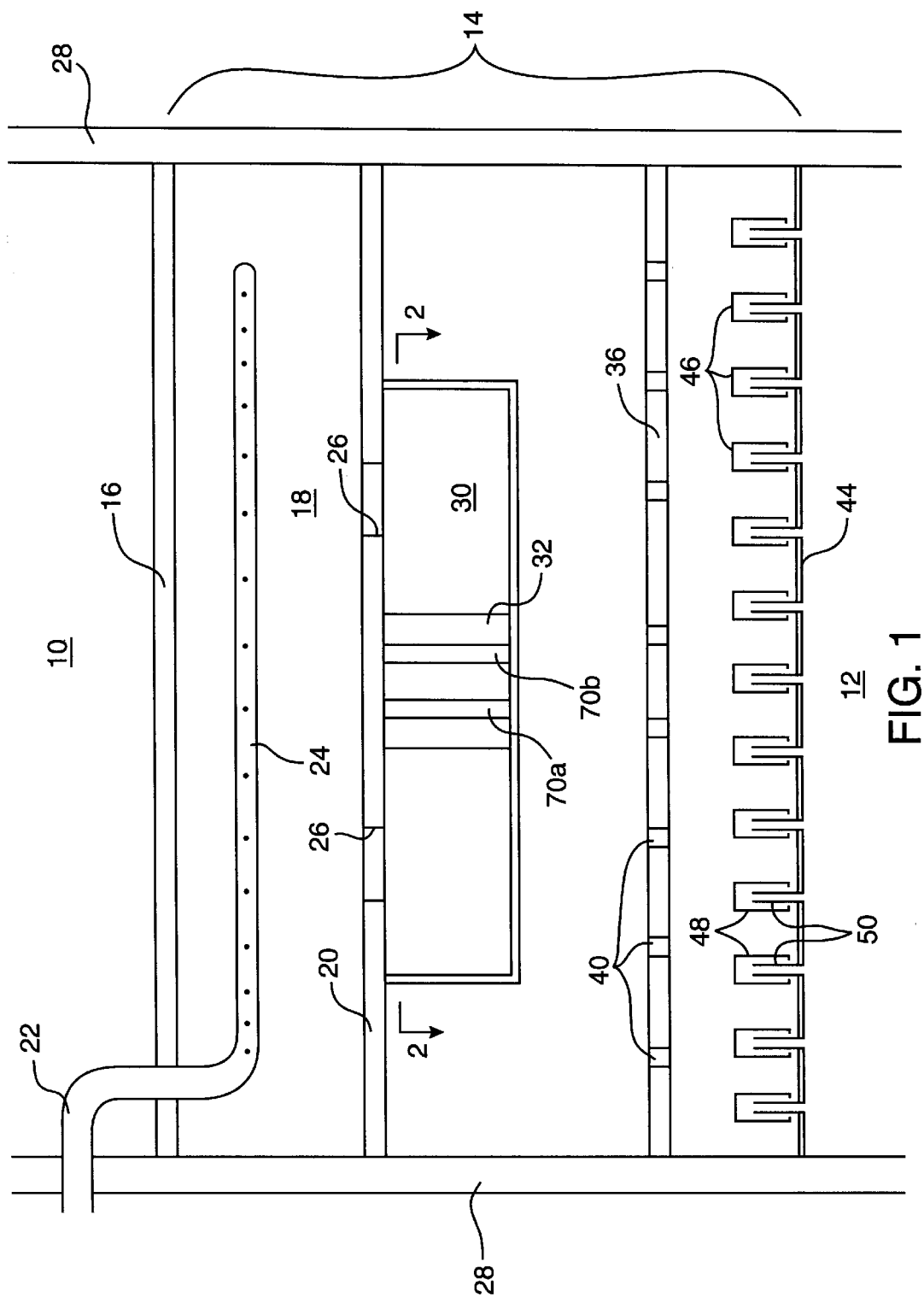
FIG. 1 is a vertical cross-sectional view of a portion of a multiple bed, down-flow catalytic reactor including the mixing chamber according to the present invention.

A portion of a multi-bed, down-flow catalytic reactor is shown in FIG. 1 including a mixing chamber which is placed in the reactor between catalyst beds to mix one or more liquid phase and vapor phase streams which are passing downward through the reactor. The mixing chamber is used to achieve a uniform concentration and temperature in the reactant stream which is distributed across the catalyst bed. This uniform distribution of liquid and vapor components in the reactant will prevent channeling and "hot spots" associated with non-uniform temperature distributions and increases the performance and efficiency of the reactor.

The portion of the multi-bed, down-flow hydroprocessing reactor shown in FIG. 1 is a substantially cylindrical reactor having reactor walls 28. The reactor includes an upper catalyst bed 10, a lower catalyst bed 12, and a mixing section 14 positioned between the upper and lower catalyst beds.

The mixing section 14 receives a reactant stream from the upper catalyst bed 10 through a catalyst support tray 16. The reactant stream from the upper catalyst bed 10 passes through the catalyst support tray 16 into a collection chamber 18 in which the fluid is collected on a collection tray 20. The reactor includes a vapor injection line 22 through which a gas, such as a hydrogen quench gas, may be injected into the reactant stream in the collection chamber 18. The injection of quench gas may be used to control the temperature and also the composition of the reactant stream. The vapor or quench gas is distributed evenly in the collection chamber 18 by a distributor such as a quench ring 24. The quench ring 24 is a ring-shaped pipe having a plurality of holes for distribution of the quench gas uniformly in the collection chamber 18.

The reactant stream passes from the collection chamber 18 into a mixing chamber 30 through two circular spaced apart openings 26 in the collection tray 20. The reactant enters the mixing chamber 30 in a generally vertical downward direction. The two streams from the circular openings 26 collide in a central portion of the mixing chamber 30 and the reactant then exits the mixing chamber on opposite sides through two side-facing outlets 32.

Flow dividers in the form of chevrons 70a, 70b are positioned within the mixing chamber 30 to improve mixing as the two reactant streams from the two openings 26 collide. Further details of the structure of the mixing chamber 30, including the inlets, outlets, and chevrons, will be provided below with respect to FIGS. 2 and 3. The mixing chamber 30 is supported by attachment to a bottom side of the collection tray 20. Alternatively, the mixing chamber 30 may be supported by a separate support structure mounted on the reactor walls 28.

The mixed reactant stream which exits the mixing chamber 30 through the side-facing outlets 32 collects above a first distributor tray 36 having a plurality of down-flow apertures 40. The liquid and vapor portions of the reactant stream pass together through the liquid down-flow apertures 40. From the first distributor tray 36, the reactant stream passes onto a second distributor tray 44 having mixers 46 which evenly distribute the reactant stream including the liquid and vapor phases across the upper surface of the lower catalyst bed 12. The mixers 46 according to one preferred embodiment of the invention are those known as bubble caps having a cap portion 48 covering a tube 50 which extends from the distributor tray 44. The cap portions 48 extend almost to the distributor tray 44 and preferably have a plurality of vertically arranged openings, such as rectangular slots (not shown) to further improve mixing. Although two distributor trays 36, 44 have been illustrated, the invention may also be used with a single distributor tray as is known in the art.

The multiple bed down-flow reactor of FIG. 1 is shown merely by way of example. It should be understood that the particular configurations of the catalyst beds 10, 12, the vapor injection port 22, and the distributor trays 36, 44 with the apertures 40 and mixers 46 may vary according to a particular application without departing from the present invention.

Figure 2:
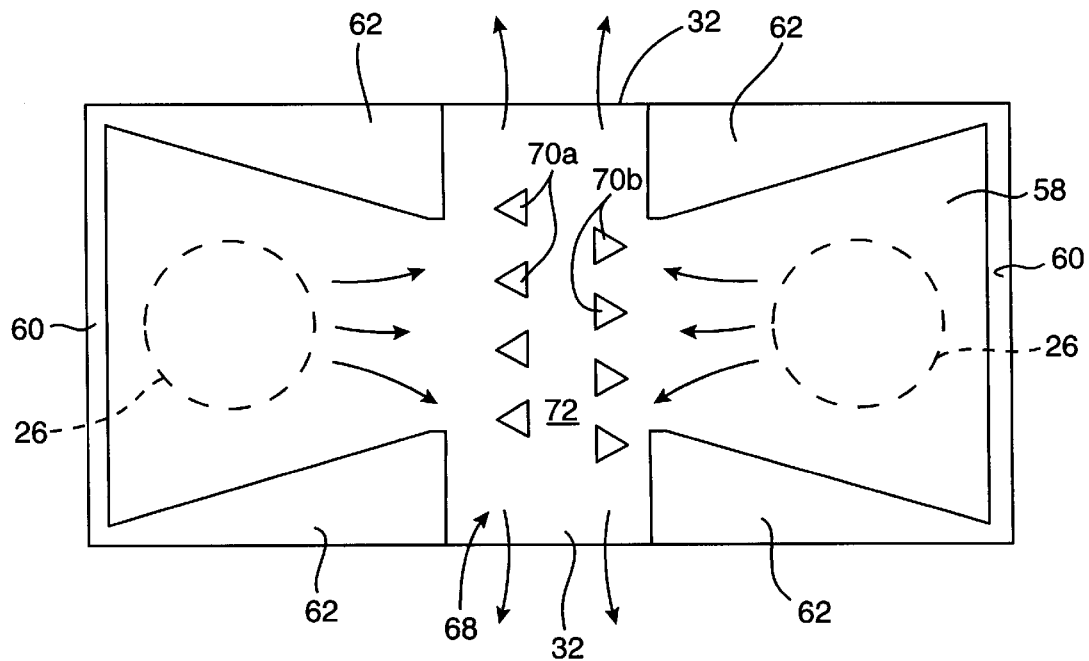
FIG. 2 is a top view of the mixing chamber taken along line 2—2 of FIG. 1.
Figure 3:
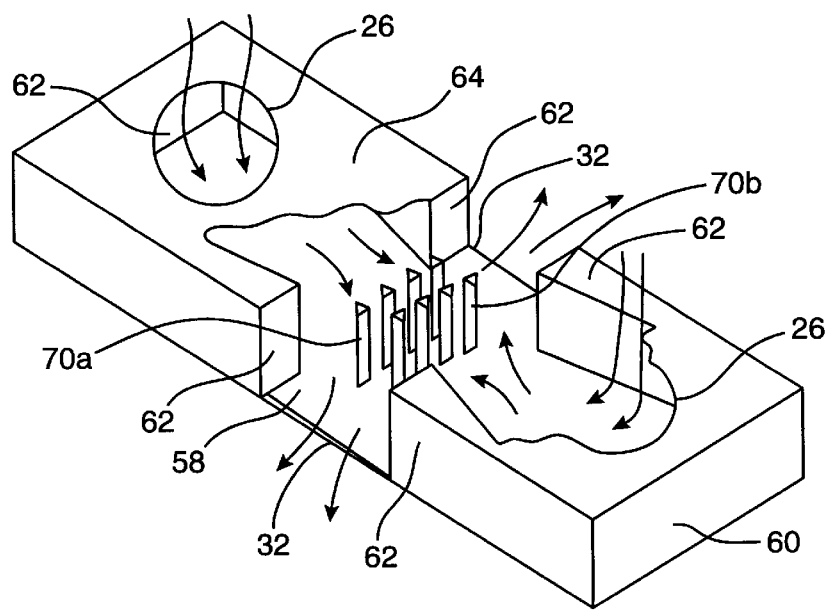
FIG. 3 is a partially cut away perspective view of the mixing chamber according to the present invention mounted beneath the collection plate.

FIGS. 2 and 3 illustrate in further detail the mixing chamber 30 which receives the reactant stream from the circular openings 26, mixes the reactant stream and outputs the mixed liquid and vapor phase reactant stream from the side-facing outlets 32. As shown in the top view of FIG. 2 and the perspective view of FIG. 3, the mixing chamber 30 is a substantially rectangular mixing box having a rectangular bottom wall 58, two end walls 60, four wedge-shaped side walls 62, and a rectangular top wall 64 (shown only in FIG. 3). The reactant stream including both liquid and vapor phases enters the mixing chamber 30 through the top wall 64 of the mixing chamber through the circular openings 26.

The inlet openings 26 are sized to accommodate the flow of reactant without causing a significant pressure drop. For example, the area of the two inlet openings 26 is preferably between 0.2 and 5 percent of the total cross-sectional area of the reactor. This will result in a pressure drop across the mixing chamber 30 of less than 5 psia, preferably less than 3 psia.

The wedge-shaped or angled side walls 62 of the mixing chamber 30 direct first and second reactant streams horizontally from the circular openings 26 to a central mixing zone 68 located between the side walls. Within the mixing zone 68 are two rows of chevrons including a first row of chevrons 70a and a second row of chevrons 70b. The chevrons 70a, 70b are objects having a substantially V-shape. The two rows of chevrons 70a, 70b are arranged on opposite sides of a central collision zone 72 where the reactant streams meet. The apexes or points of the chevrons 70a, 70b are directed away from the central collision zone 72. As illustrated in FIG. 2, the chevrons 70a in one of the two rows are staggered with respect to the chevrons 70b in the other row to achieve improved mixing.

As the reactant streams enter from opposite sides of the mixing zone 68, the fluid streams come into contact with the chevrons 70a, 70b which cause turbulence in the fluid. This turbulence improves the mixing of the liquid and vapor phases of the reactant stream which occurs in the central collision zone. The staggered arrangement of the chevrons in the two rows provides improved mixing by allowing the two oppositely directed streams to intermingle to a greater degree than is possible without the chevrons. This intermingling of portions of the opposed streams which have been divided by the chevrons 70a, 70b provides improved mixing without a significant pressure drop.

The fully mixed reactant streams then pass out of the mixing chamber 30 horizontally through the side-facing outlets 32 in a direction which is substantially perpendicular to the direction in which the two reactant streams enter the mixing zone 68. These side-facing outlets 32 are sized to prevent significant pressure drop. A total cross sectional area of the two outlets 32 is preferably roughly equal to a total cross sectional area of the two circular openings 26.

FIG. 3 shows a perspective view of the mixing chamber 30 mounted on the collection plate 20 with a portion of the top wall 64 of the mixing chamber cut away. The chevrons 70a, 70b extend from the bottom wall 58 of the mixing chamber to the top wall 64 of the mixing chamber and may be formed in a variety of cross-sectional shapes and sizes. Although the chevrons 70a, 70b have been illustrated as having a triangular shape in cross-section, they may also have other shapes such as a V-shape or an A-shape in cross-section and may have somewhat concave or convex side walls. Flow dividers of other cross-sectional shapes such as oval, circular, or semi-circular can also be used.

The description of the preferred embodiments of the present invention is primarily for purposes of illustration. Various modification and changes in the structural arrangement and in the steps set forth for mixing in a down-flow reactor will occur to those skilled in the art. All such modification or changes coming within the scope of the pending claims are intended to be included therein.

What is claimed is:

1. A mixing chamber for a catalytic reactor comprising:
   a first inlet directing a first stream of inlet fluid in a first direction;
   a second inlet directing a second stream of inlet fluid in a second direction which is generally opposite to the first direction;
   a first plurality of chevrons arranged along a first line substantially perpendicular to the first direction for intercepting and dispersing the first stream of inlet fluid;
   a second plurality of chevrons arranged along a second line substantially parallel to the first line for intercepting and dispersing the second stream of inlet fluid;
   a first outlet directing a first outlet stream in a direction substantially perpendicular to the first and second directions; and
   a second outlet directing a second outlet stream in a direction substantially opposite to the direction of the first outlet stream.

2. The mixing chamber for a catalytic reactor according to claim 1, wherein the mixing chamber is a mixing box and the first and second inlets include circular entrance openings and channels directing fluid from the circular openings toward the chevrons.

3. The mixing chamber for a catalytic reactor according to claim 2, wherein the channels directing the fluid from the circular openings toward the chevrons taper from a larger dimension adjacent the circular entrance openings to a smaller dimension approaching the chevrons.

4. The mixing chamber for a catalytic reactor according to claim 1, wherein the first plurality of chevrons are positioned in a staggered arrangement with respect to the second plurality of chevrons.

5. The mixing chamber for a catalytic reactor according to claim 1, wherein the mixing chamber is a mixing box having a top and a bottom, and the first and second plurality of chevrons are elongated members extending from the top to the bottom of the mixing box.

6. The mixing chamber for a catalytic reactor according to claim 5, wherein the first and second plurality of chevrons have a V-shape in cross section.

7. The mixing chamber for a catalytic reactor according to claim 5, wherein the first and second plurality of chevrons have a triangular shape in cross section.

8. The mixing chamber for a catalytic reactor according to claim 1, wherein the first direction is substantially vertical.

9. A hydroprocessing reactor comprising:
   a collection tray;
   a mixing chamber receiving fluid from the collection tray, the mixing chamber including two opposed inlets directing streams of fluid to a mixing zone, the mixing zone including two rows of spaced chevrons and a collision zone between the rows of spaced chevrons, and the chevrons arranged to improve the mixing within the collision zone;
   a distributor tray receiving fluid which has been mixed by the mixing chamber; and
   a catalyst bed receiving fluid from the distributor tray.

10. The hydroprocessing reactor according to claim 9, wherein the mixing chamber includes two fluid outlets directing fluid out of the mixing chamber in a direction which is generally perpendicular to the direction in which the two opposed inlet streams enter the mixing zone.

11. The hydroprocessing reactor according to claim 10, wherein the two fluid outlets are arranged to direct fluid out of the mixing chamber in a generally horizontal direction, and the fluid passes through the reactor in a generally vertical direction from a reactor inlet to a reactor outlet.

12. The hydroprocessing reactor according to claim 10, wherein the two rows of chevrons are arranged parallel to one another and the stream of fluid is directed to the mixing zone in a direction perpendicular to the rows of chevrons.

13. The hydroprocessing reactor according to claim 12, wherein the chevrons in a first of the two rows are positioned in a first orientation and the chevrons in a second of the two rows are positioned in a second orientation opposite to the first orientation.

14. The hydroprocessing reactor according to claim 9, wherein the chevrons in a first of the two rows are staggered with respect to the chevrons in the second of the two rows.

15. A method of mixing liquid and vapor phases of a fluid in a hydroprocessing reactor comprising:
   directing a fluid containing both liquid and vapor phases in two oppositely directed streams toward a mixing zone;

creating turbulence in the fluid within the mixing zone by passing the oppositely directed fluid streams around two rows of spaced apart flow dividers, wherein the flow dividers in a first of the two rows are staggered with respect to the flow dividers in a second of the two rows;

colliding the two oppositely directed streams which have passed around the flow dividers in a collision zone; and outputting a mixed fluid having liquid and vapor phases evenly interspersed.

16. The method of mixing liquid and vapor phases according to claim 15, wherein the mixed fluid is output in a direction substantially perpendicular to directions of the two oppositely directed fluid streams.

17. The method of mixing liquid and vapor phases according to claim 15, wherein the turbulence is created by flow dividers having a shape of a chevron.

18. The method of mixing liquid and vapor phases according to claim 15, wherein the outputted mixed fluid is passed through a distributor plate which distributes the mixed fluid across a catalyst bed.

19. The method of mixing liquid and vapor phases according to claim 15, wherein the fluid is directed in the two oppositely directed streams by passing through two spillways into a mixing chamber and having side walls for directing the oppositely directed streams to the mixing zone.

20. The method of mixing liquid and vapor phases according to claim 15, wherein the mixing process is performed on fluid which has exited a first catalytic bed and after mixing enters a second catalytic bed.

21. The hydroprocessing reactor according to claim 9, wherein each of the chevrons includes a first side surface and a second side surface, the first and second side surfaces forming a V-shape for dispersing the streams of fluid.

22. The method of mixing liquid and vapor phases according to claim 15, wherein the two rows of chevrons are parallel.

\* \* \* \* \*